United States Patent [19]

Fuerst et al.

[11] Patent Number: 4,746,165
[45] Date of Patent: May 24, 1988

[54] VEHICLE ROOF HAVING AN OPERATING DEVICE FOR SWINGING AND SLIDING A COVER

[75] Inventors: Arpad Fuerst, Munich; Burkhard Reinsch, Neuried, both of Fed. Rep. of Germany

[73] Assignee: Webasto-Werk W. Baier GmbH & Co., Stockdorf, Fed. Rep. of Germany

[21] Appl. No.: 69,107

[22] Filed: Jul. 2, 1987

[30] Foreign Application Priority Data

Jul. 12, 1986 [DE] Fed. Rep. of Germany ....... 3623537

[51] Int. Cl.4 ............................ B60J 7/047; B60J 7/19
[52] U.S. Cl. .................................. 296/216; 296/220; 296/223; 296/224
[58] Field of Search ............... 296/216, 220–224

[56] References Cited

FOREIGN PATENT DOCUMENTS

| | | | |
|---|---|---|---|
| 3202646 | 8/1983 | Fed. Rep. of Germany . | |
| 3311452 | 10/1983 | Fed. Rep. of Germany . | |
| 0157622 | 12/1981 | Japan | 296/222 |
| 0175121 | 8/1986 | Japan | 296/221 |
| 0175122 | 8/1986 | Japan | 296/221 |
| 2113623 | 8/1983 | United Kingdom . | |
| 2133460 | 7/1984 | United Kingdom | 296/221 |

*Primary Examiner*—Dennis H. Pedder
*Attorney, Agent, or Firm*—Sixbey, Friedman & Leedom

[57] ABSTRACT

Vehicle roof with an operating device of the type having a cover arrangement with at least one cover which, from a position in which it closes a roof opening, can be swung into a raised position from which it can then be slid back. On both sides of the roof opening are fastened guide rails in each of which a first slider and a second slider connected to a drive device are guided in a sliding manner. The cover is supported on the first slider in a swinging manner. The second slider is connected by a lifting device to a raising lever which is pivotally connected to the first slider at one end and is pivotally connected to the cover at an opposite end. A locking device prevents the cover from sliding in relation to the guide rails during swinging between the closed position and the raised position.

23 Claims, 5 Drawing Sheets

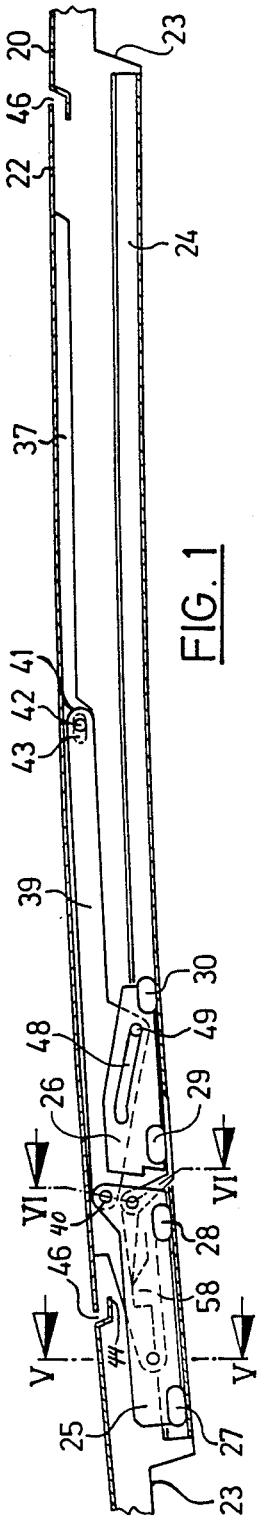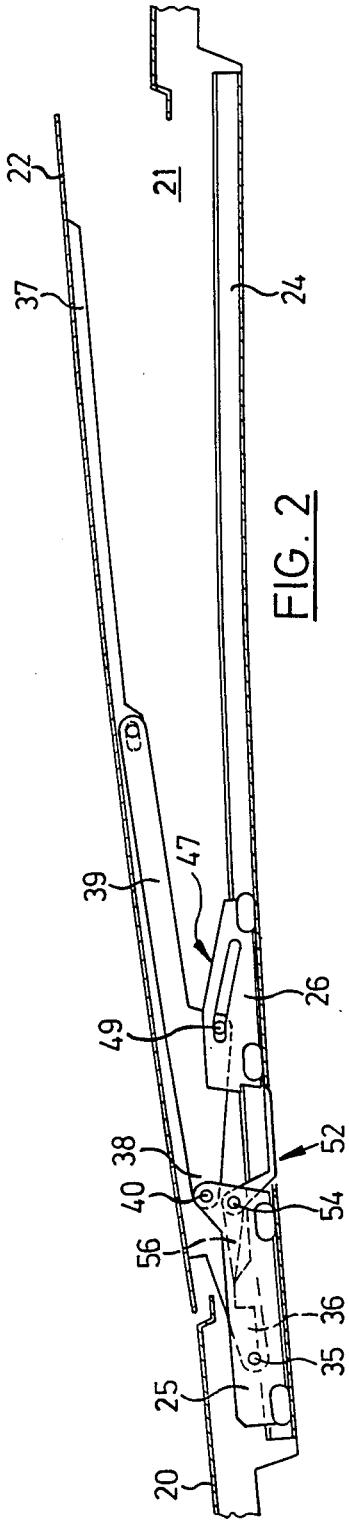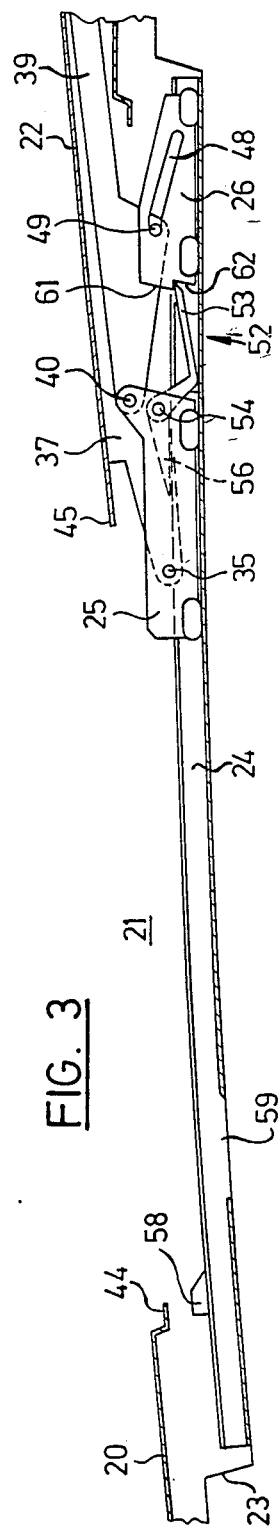

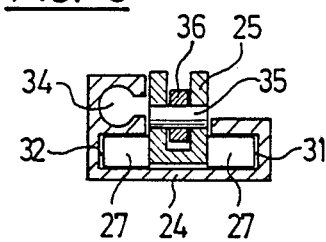
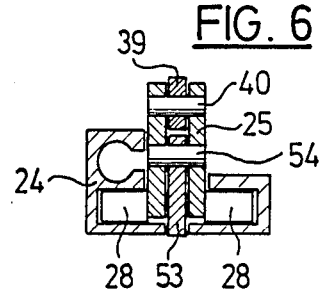
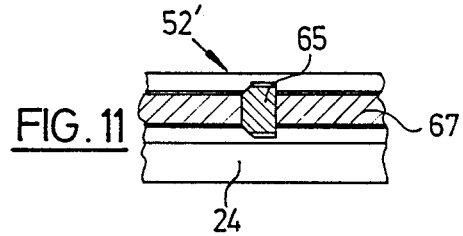
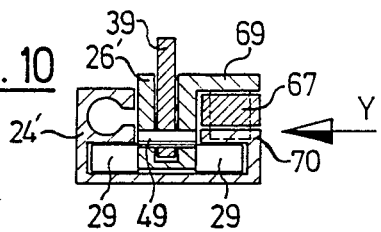
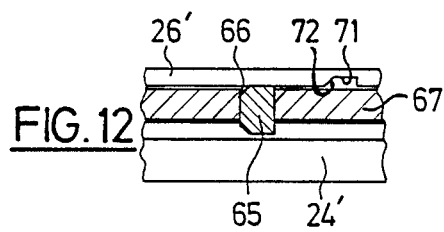
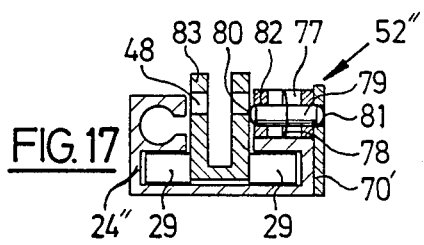
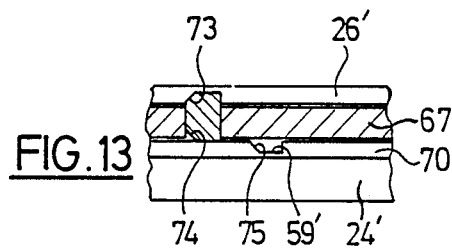
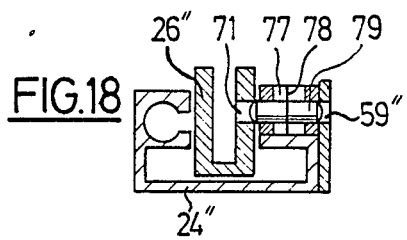
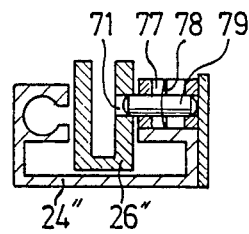

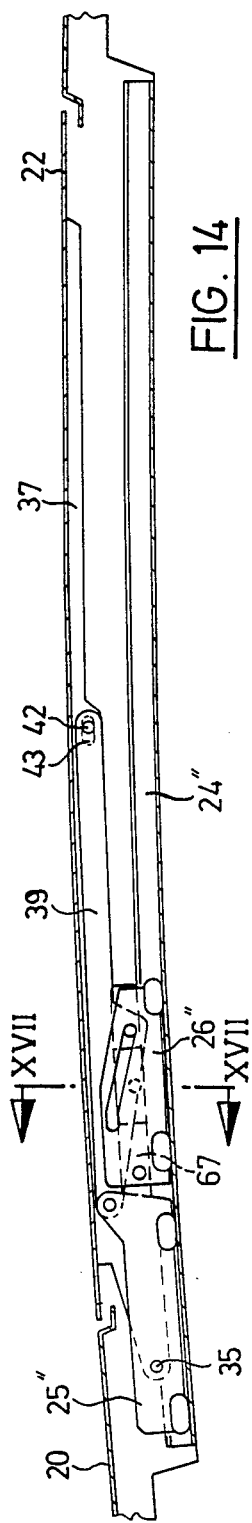
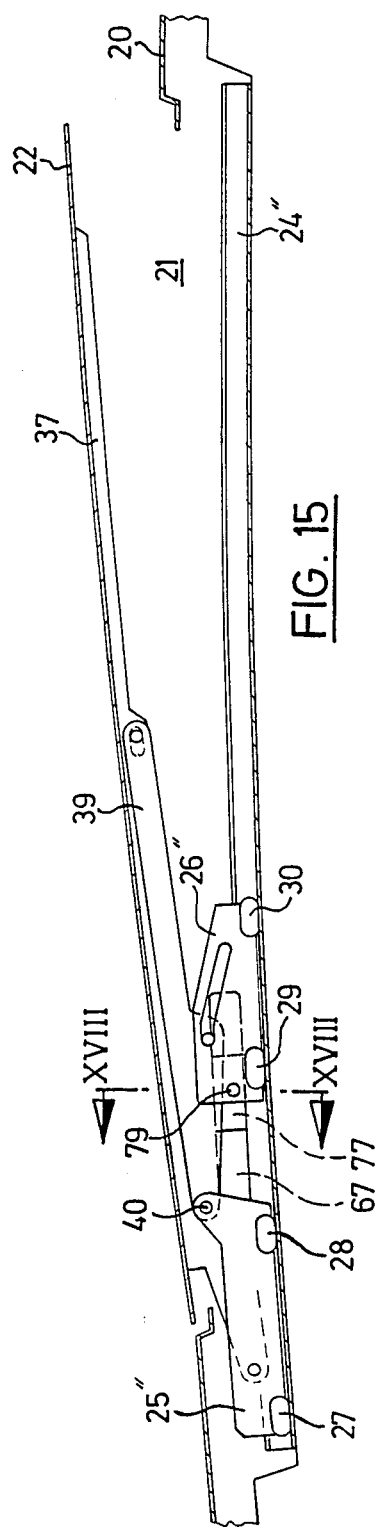
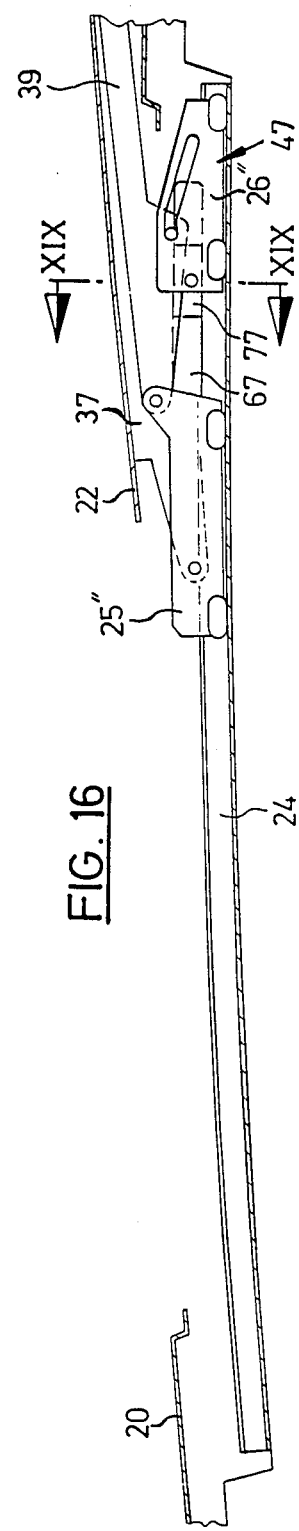
FIG. 14
FIG. 15
FIG. 16

VEHICLE ROOF HAVING AN OPERATING DEVICE FOR SWINGING AND SLIDING A COVER

BACKGROUND AND SUMMARY OF THE INVENTION

The invention relates to a vehicle roof of the type having an operating device by which at least one cover of a cover arrangement may, from a position closing a roof opening, be swung into a raised position and then slid back. In particular, wherein for the sliding movement, guide rails are fastened on both sides of the roof opening under the fixed roof surface, a first slider and a second slider connected to a drive device being guided in a slidable manner within each guide rail, and wherein, for the swinging movement, the cover system is supported in a pivotal manner on the first slider, and the second slider can slide in relation to the first slider and is connected by a lifting device to a raising lever that is pivotally connected to the cover system at its end spaced furthest from the first slider. The lifting device acts on an intermediate portion of raising lever. Further a locking device is provided, which prevents the cover system from sliding in relation to the guide rails during swinging movement between the closed position and the raised position.

In a known roof with an operating device of this type (German Offenlegungsschrift 33 11 452), the first slider is formed from a slide shoe with a pivot pin, on which a cover support for the cover of a spoiler roof is articulated. The raising lever carries, in its longitudinal center area, a link pin with a slide shoe that is guided in a sliding manner in a respective guide rail. By operation of the lifting device, the raising lever can be swung around this link pin. On the front end of the raising lever, which is located opposite the link pin, a guide element is fastened which, when the cover is raised, plunges into the guide rail and which, when the cover is swung into the closed position, moves upward out of the guide rail and rests against a turned-up stop of the guide rail. The stop, together with the guide element, forms the locking device, which prevents the cover from sliding in relation to the respective guide rail as the cover is swung between the closed and raised positions. In the known operating device, the achievable stability leaves much to be desired.

The invention, thus, has a primary object of providing a roof with an operating device, of the type initially mentioned, which is marked by an especially simple, sturdy and reliable construction that requires little space.

This object, according to the present invention, is obtained by having the front end of the raising lever pivotally connected to a respective first slider. By the articulation both of the cover system and also of the raising lever on the first slider, a particularly stable design is obtained, which effectively prevents uncontrolled cover movements.

Preferably, the pivot bearing connecting the front end of the raising lever with the first slider is compactly arranged under the cover system in the closed position of the cover system, suitably on the rear upper end of the first slider. As a result a relatively small swinging angle of the raising lever is sufficient to bring the cover system, for example the cover of a spoiler roof or a segment of a segmental roof (of the type shown in German Offenlegungsschrift No. 32 02 646) into a predetermined oblique position in relation to the fixed roof surface. The articulation point of the raising lever on the cover system can be shifted far back, which also contributes to enhanced stability. With little overall height of the operating device, comparatively great raising movements of the cover system can be forced.

The lifting device can be designed in a known way, as a guiding slide system of the type shown in the above-mentioned German Offenlegungsschrift No. 33 11 452. In this case, a single link guide generally suffices, for example in the form of a guide slot, with which a link pin or the like works. Advantageously, the lifting device acts in the area of the front half of the raising lever, as a result of which a lever translation is obtained, which converts a small lift travel of the lifting device into a large elevational adjustment of the raising lever end acting on the cover system, and thus further serves to minimize the overall height of the operating device.

These and further objects, features and advantages of the present invention will become more obvious from the following description when taken in connection with the accompanying drawings which show, for purposes of illustration only, several embodiments in accordance with the present invention.

BRIEF DESCRIPTION OF THE DRAWINGS

FIG. 1 is a diagrammatic longitudinal section of a spoiler roof, having an operating device in accordance with the present invention, within a closed cover position;

FIG. 2 is a section corresponding to FIG. 1, but with the cover shown raised in a front end position;

FIG. 3 is a section corresponding to FIGS. 1 and 2 but with the cover shown raised and slid back;

FIG. 5 is a section taken along line V—V of FIG. 1;

FIG. 6 is a section taken along line VI—VI of FIG. 1;

FIG. 10 is a section taken along line X—X of FIG. 7;

FIGS. 11, 12 and 13 are side views as seen in the direction of an arrow Y in FIG. 10 and showing the location of a stop member for different positions of the cover;

FIGS. 14, 15 and 16 are diagrammatic longitudinal sections similar to FIGS. 1, 2 and 3 of a spoiler roof with a further modified embodiment of the operating device;

FIG. 17 is a section taken along line XVII—XVII of FIG. 14;

FIG. 18 is a section taken along line XVIII—XVIII of FIG. 15; and

FIG. 19 is a section taken along line XIX—XIX of FIG. 16.

DETAILED DESCRIPTION OF THE PREFERRED EMBODIMENTS

Figure 4:
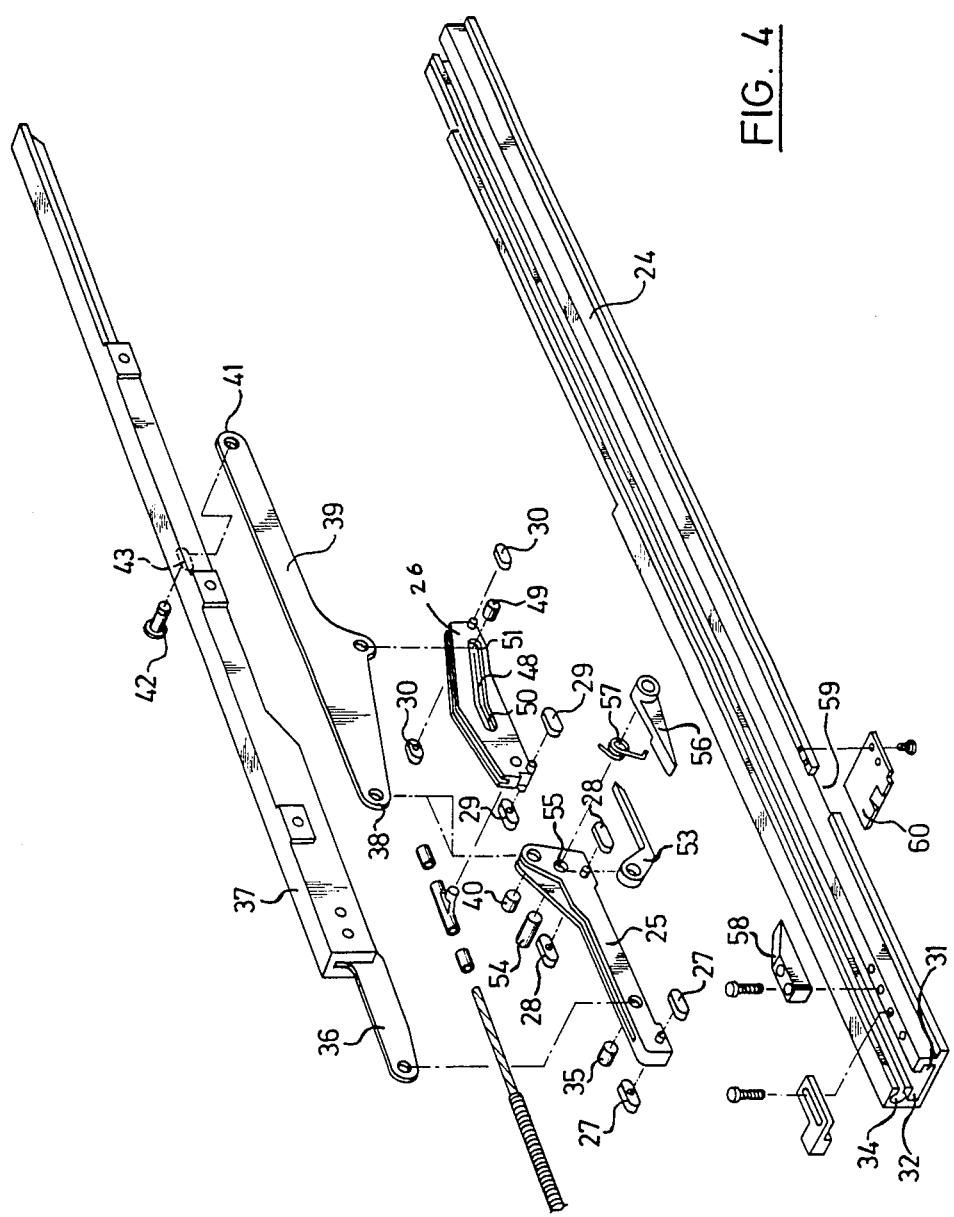
FIG. 4 is an exploded perspective view of the essential components of the operating device of the spoiler roof according to FIGS. 1 to 3.

According to FIGS. 1, 2 and 3, a roof opening 21 is provided in a vehicle fixed roof surface 20. By means of a rigid cover 22, roof opening 21 can be selectively closed or at least partly opened. Cover 22 can be made of a translucent or transparent material, such as glass or plastic. In the illustrated embodiment, it is made of sheet metal. Roof opening 21 is surrounded by a roof frame 23. To each of the two longitudinally extending, lateral sides of roof frame 23 is fastened a guide rail 24 which also extends in the longitudinal direction of the vehicle. By means of an operating device, explained more in detail below, cover 22 can be swung from its closed position (FIG. 1) up into a raised position (FIG. 2) and then slid back over a rearward portion of fixed roof surface 20 (FIG. 3). Thus, in the embodiment according to FIGS. 1 to 3, a so-called spoiler roof is involved. In this case, the guide rails can be designed to be straight or may be curved in the longitudinal direction in correspondence with the curvature of the roof. It is also possible to give the guide rails 24 a curvature in the longitudinal direction of the roof that deviates from the curvature of the roof in order to influence, in a desired way, the raised angle and/or the raised height of the cover during sliding back, especially so that the drag remains small even when the vehicle is travelling at high speeds. Since the roof has mirror image symmetry with respect to a central longitudinal axis, it suffices to explain below only the construction and functioning of the system on one side.

A first slider 25 and a second slider 26 sitting behind it in the longitudinal direction of the roof are movably guided along guide rail 24. The two sliders 25, 26 are designed as elongated sliding carriages. First slider 25 carries front slide shoes 27 and rear slide shoes 28 on each of its opposite lateral sides. In a corresponding way, second slider 26 is provided with front slide shoes 29 and rear slide shoes 30 on each of its opposite lateral sides (FIG. 4). Slide shoes 27, 28, 29, and 30 engage in an inner guide channel 31 or an outer guide channel 32 of guide rail 24 (the terms "inner" and "outer" being used with reference to relative positioning with respect to the longitudinal center axis of the roof). Second slider 26 is connected to a drive device. In the illustrated embodiment, a pressure resistant threaded cable 33 acts on second slider 26. Cable 33 is guided in a cable guide channel 34 of guide rail 24 and, in a known way, is in a driven connection with a drive motor or a hand-operated crank.

A downwardly offset, projecting attachment 36 of a cover support 37 is articulated by a link pin 35 near the front end of first slider 25. Front end 38 of a raising lever 39 is pivotally connected by a link bolt 40 to an upwardly projecting portion of the rear end of first slider 25. The pivot bearing for the front end 38 of raising lever 39 formed by link bolt 40, sits closely under cover 22 in the closed position of the cover shown in FIG. 1. The pivot, around which raising lever 39 swings, consequently, is placed as high as possible.

The rear end 41 of raising lever 39 (which is furthest from first slider 25) is articulated on cover support 37 by a link pin 42, which engages in an elongated slot 43 of cover support 37. As can be seen in FIG. 1, in the closed position of the cover, the articulated joint formed by link pin 35 is located between the first slider 25 and the cover support 37 in front of the front edge 44 of roof opening 21, and the articulated joint formed between the first slider 25 and the raising lever 39 by link bolt 40 is located rearwardly of the front edge 44 of the roof opening 21. As a result, a plunging of front edge 45 of cover 22 under the plane of fixed roof surface 20 is prevented in practice. A seal (not shown) used for closing edge gap 46 between cover 22 and fixed roof surfaces 20 is protected, in this way, from damage resulting from the raising movement of the cover 22.

Raising lever 39 is swung around link bolt 40 by means of a lifting device which, in the embodiment shown, is designed as a guiding slide system 47. Guiding slide system 47 comprises a slotted guide, in the form of an angular guide slot 48, and a link pin 49 fastened to raising lever 39. Pin 49 is slidable along guide slot 48. Guide slot 48 has a front section 50 that extends approximately parallel to guide rail 24 and from which an inclined rear portion 51 extends obliquely downward. In the embodiment shown in FIGS. 1 to 4, the design is such that the lifting device (slide system 47) acts in the area of the front half of raising lever 39, while raising lever 39, for its part, acts on cover support 37 in the longitudinal center area of the cover.

Also provided is a locking device identified, as a whole, by reference numeral 52. Locking device 52 prevents cover 22 from sliding with respect to guide rails 24 as the cover swings between the closed position (FIG. 1) and the raised position (FIG. 2). In the embodiment according to FIGS. 1 to 6, locking device 52 comprises a locking lever 53, which is articulated on the rear end of first slider 25 by means of link pin 54. Link pin 54 is solidly connected to rotate with the locking lever and is rotatably mounted in a bearing bore 55 of first slider 25. Further, an adjustment arm 56 is also solidly connected to link pin 54. On link pin 54 is a torsion spring 57, which seeks to swing the unit (in FIGS. 1 to 4) consisting of locking lever 53, link pin 54 and adjustment arm 56 counterclockwise with respect to first slider 25. Guide rail 24 carries a supporting incline 58, which engages with the front end of adjustment arm 56 when cover 22 approaches its front end position and swings unit 53, 54, 56 clockwise (in FIGS. 1-4) against the force of torsion spring 57 until locking lever 53 fits in a stop recess 59 of guide rail 24. Stop recess 59 is downwardly limited by a cover plate 60 (shown only in FIG. 4) that is fastened to guide rail 24.

If, starting from the cover closed position according to FIG. 1, second slider 26 is slid rearward by means of threaded cable 33, first of all, first slider 25, and with it cover support 37 and cover 22, are prevented from sliding with respect to guide rail 24, since locking lever 53 is engaged in stop recess 59 of guide rail 24 and is locked in this position by the fact that the second slider 26 is standing over the locking lever. Guide slot 48 moves rearward causing link pin 49 upward as it moves along rear section 51 of guide slot 48. Raising lever 39 is thus caused to make a counterclockwise swinging movement around the axis of link bolt 40. This, for its part, causes a swinging of cover support 37 around the pivot axis formed by link pin 35. When cover 22 has reached its fully raised position, link pin 49 goes into front section 50 of guide slot 48. Front section 50 of guide slot 48 provides for tolerance compensation and a stable holding of cover 22 in the fully raised position. When cover 22 has been fully raised, second slider 26 releases locking lever 53 as shown in FIG. 2.

When the front end wall of link slot 48 rests against link pin 49, first slider 25 is carried along by raising lever 39 as it moves further rearward because of the releasing of locking lever 53 and since, as adjustment arm 56 disengages from supporting incline 58, torsion spring 57 swings locking lever 53 counterclockwise into the position shown in FIG. 3. The upward swinging movement of locking lever 53 is limited by its rear end engaging under a forward projecting nose 61 of second slider 26. Sliders 25, 26 continue their joint rearward sliding movement until the rear end position, shown in FIG. 3, is reached. Thus sliders 25, 26 remain at a constant distance from each other which is determined by the distance between link bolt 40 and link pin 49.

If second slider 26 is moved forward from the position according to FIG. 3, by threaded cable 33, its face 62 (which faces toward slider 25) pushes locking lever 53, and with it slider 25, slider 25 being maintained at the distance permanently preset by the length of locking lever 53. This distance of sliders 25, 26 is equal or almost equal to the distance between sliders 25, 26 during the rearward sliding movement. Since the distance between sliders 25 and 26 determines the upwardly raised angle of inclination of the cover support 37 with respect to guide rail 24, it is guaranteed that cover 22, in the passage from the position in FIG. 2 to the position according to FIG. 3 and vice versa, remains practically constant with respect to guide rail 24. When, during the course of the forward sliding movement, adjustment arm 56 reaches supporting incline 58, the adjustment arm 56 and the locking lever 53 are swung clockwise against the force of torsion spring 57 until, once again, locking lever 53 fits into stop recess 59 of guide rail 24 so that first slider 25 and with it cover support 37 and cover 22 are prevented from a further sliding movement with respect to guide rail 24. On the other hand, locking lever 53 is released from face 62 of second slider 26 so that the second slider 26 can move further forward with respect to first slider 25, thereby causing cover 22 to swing in the direction of the closed position (FIG. 1) by slide system 47.

The embodiment according to FIGS. 7 to 13 differs from the above explained embodiment of FIGS. 1 to 6 only in regard to the design of the locking device, which is identified, as a whole, by numeral 52' in FIG. 11 so as to distinguish it from the locking device of FIGS. 1–6. Other modified elements likewise bear a prime (') designation, but unchanged common elements of these two embodiments bears like reference numerals. In the case of this second embodiment, the locking device 52' comprises a locking member in the form of a stop block 65. Stop block 65 is guided in a vertically displaceable manner in a cutout 66 of an attachment 67 of first slider 25, while being transported with the attachment 67 in the sliding direction of sliders 25', 26'.

Figure 7:
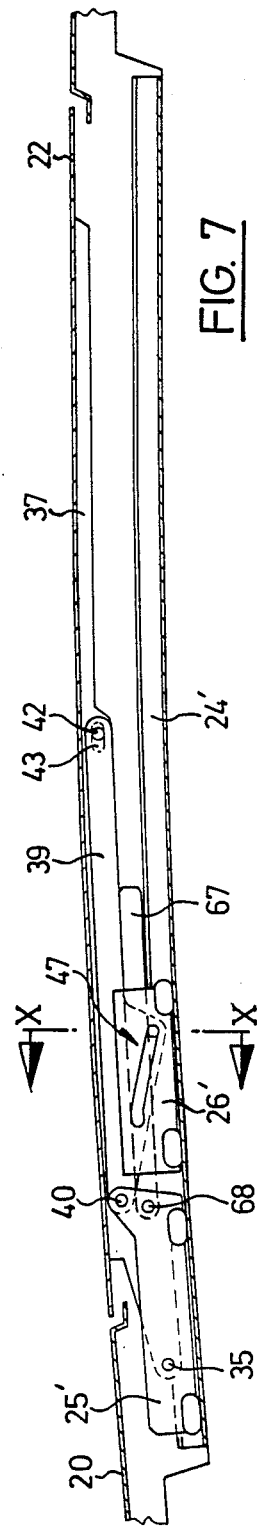
FIGS. 7, 8 and 9 are diagrammatic longitudinal sections similar to FIGS. 1, 2 and 3 of a spoiler roof with a modified embodiment of an operating device in accordance with the invention.
Figure 8:
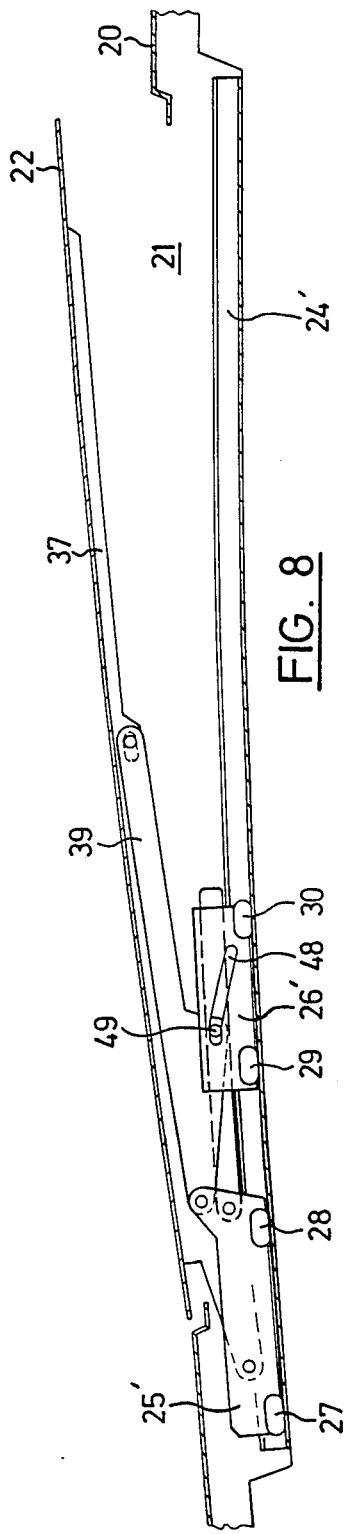
Figure 9:
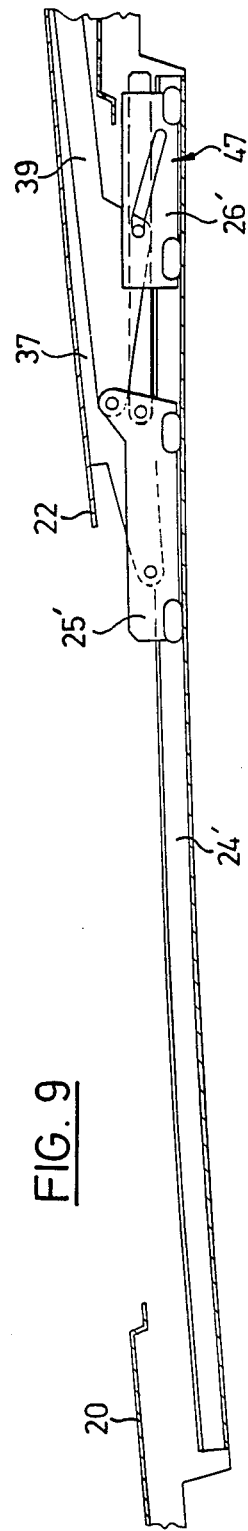

According to FIGS. 7 to 9, attachment 67 (which is in the nature of a bar-like extension) is pivotally connected to first slider 25' by a connecting pin 68, but slider 25' and attachment 67 can also be of a one-piece construction or unitarily joined with one another. Second slider 26' has a flange 69 which overlies a web 70 of guide rail 24 in spaced relation thereto so as to form a guide slot within which attachment 67 is slidable (FIG. 10). In this embodiment, stop recess 59' of guide rail 24 is designed in web 70 (FIG. 13), and flange 69 of second slider 26 is provided with another stop recess 71 (FIG. 12).

The locking device 52' is so designed that, in the forward raised position of cover 22 (FIG. 8), cutout 66 and the two stop recesses 59', 71 are aligned with one another in the longitudinal direction of guide rail 24', and stop block 65 can partially engage in the two stop recesses 59, 71 (FIG. 11). If, starting from this relative position, second slider 26' is moved forward, an inclined surface 72 of stop recess 71 interacts with an inclined surface 73 of stop block 65, causing stop block 65 to slide further down into stop recess 59 of guide rail 24' until stop block 65 disengages from second slider 26'. Thus, first slider 25' remains locked in relation to guide rail 24', but the second slider 26' can continue to move forward until cover 22 reaches its closed position (FIG. 7).

On the other hand, if, starting from the position according to FIGS. 8 and 11, second slider 26' is slid rearward by means of threaded cable 33, second slider 26' carries along slider 25' by placing of the front limiting wall of guide slot 48 on link pin 49 of raising lever 39. However, due to the interaction of another inclined surface, 74, of stop block 65 with an inclined surface 75 of stop recess 59 (caused by the relative movement of the sliders with respect to guide rail 24'), stop block 65 is slid out of stop recess 59 and slid further into stop recess 71 of second slider 26'. As a result, sliders 25', 26' are coupled to one another for a joint sliding movement in relation to guide rail 24'. Web 70 does not allow an uncoupling between sliders 25', 26' until the relative position according to FIGS. 8 and 11 has again been reached. That is, in the passage from the position according to FIG. 8 to the position according to FIG. 9 and vice versa, sliders 25', 26' perform a joint sliding movement at a fixed distance with respect to each other.

The further embodiment according to FIGS. 14 to 19 is similar to the second embodiment explained above in that a slidable stop element is slid in and out of respective stop openings in the second slider and guide rail. However, in this case, a cutout 77 is provided in rear attachment 67' of first slider 25". In cutout 77 there is a flat spring 78 that is oriented in a vertical plane running parallel to guide rail 24". Flat spring 78 is solidly connected a stop pin 79, which is at right angles with flat spring 78, crosswise relative to the longitudinal direction of guide rail 24". Stop pin 79, on both sides, has hemispherical ends 80, 81 and is mounted in a sliding manner in a crosswise bore 82 of attachment 67'. In a web 70' of guide rail 24" (functionally corresponding to web 70 of the embodiment according to FIGS. 7 to 13) and in body 83 of second slider 26", stop recesses 59" and 71', designed as cylindrical bores, are so arranged that, in the forward raised position of cover 22 (FIG. 15) crosswise bore 82 and stop recesses 59, 71 are aligned with one another (FIG. 18). Flat spring 78 seeks to hold stop pin 79 in the position represented in FIG. 18, in which stop pin 79 projects from crosswise bore 82 symmetrically or nearly symmetrically on both sides. Analogously to stop block 65, stop pin 79, depending on the direction in which second slider 26 is slid, starting from the position according to FIG. 15, provides for a locking of first slider 25" in relation to guide rail 24" (FIGS. 14 and 17) or for a mutual coupling of the two sliders 25", 26" (FIGS. 16 and 19). In this case hemispherical ends 80, 81 of the stop pin act in a manner corresponding to that of inclined surfaces 73, 74 of stop block 65.

It should be understood that further changes are also possible. For example, two sliders can be so guided and designed that they overlap one another, at least partially, crosswise to the sliding direction. In such a case, attachment 67 can be eliminated, and a stop element corresponding to stop block 65 or stop pin 79 can be directly mounted on or in the first slider. Instead of longitudunal slot 43, a corresponding longitudinal slot can also be provided in the area of link pin 35 or link bolt 40. Alternatively, such a longitudinal slot can optionally be totally eliminated, if at least one of links 35, 40, 42 is elastically deflectable to a certain extent, for example, an elastically deformable link bolt or link pin is used.

The operating device was described above with reference to a spoiler type roof, but it is also suitable for operating a cover of other types of roofs, e.g., for adjusting a segmental roof.

Accordingly, while various embodiments in accordance with the present invention have been shown and described, because of the numerous changes and modifications to which it is susceptible, as will be apparent to those skilled in the art, we, therefore, do not wish to be limited to the details shown and described herein, but rather intend to cover all such changes and modifications as are encompassed by the scope of the appended claims.

We claim:

1. A vehicle roof of the type having an operating device by which at least one cover of a cover arrangement is, from a position closing a roof opening, in a fixed roof surface swung into a raised position and from said raised position slid rearwardly above said fixed roof surface each side of the roof opening under a fixed roof surface, a first slider and a second slider connected to a drive device and guided in a slidable manner in each guide rail; wherein the cover is pivotally connected, at a front end, to the first slider, and, rearwardly of the front end, is pivotally connected to a first end of a raising lever, the raising lever being pivotally connected at a second, opposite, end to said first slider and intermediate said first and second ends being connected by a lifting device to said second slider, the lifting device acting for raising and lowering of the cover during relative movement between the first and second sliders, and wherein a locking device prevents the cover from sliding in relation to the guide rails during swinging of the cover between the closed position and the raised position.

2. Vehicle roof according to claim 1, wherein a pivot bearing forming the pivotal connection between the second end of the raising lever and the first slider is closely located under the cover in said closed position.

3. Vehicle roof according to claim 1, wherein the lifting device is a guiding cam and sliding follower.

4. Vehicle roof according to claim 3, wherein the guiding cam and sliding follower comprises a slotted guide of the second slider and at least a link pin that is fastened on the raising lever and slidable within the slotted guide.

5. Vehicle roof according to claim 1, wherein the connection between the second slider and the raising lever provided by the lifting device is located in an area of a front half of the raising lever.

6. Vehicle roof according to claim 1, wherein the second slider is located rearwardly of the first slider in a longitudinal direction of a respective guide rail.

7. Vehicle roof according to claim 1, wherein the roof is of the spoiler roof type having a cover which can be slid back into an open position partially overlapping the fixed roof surface, wherein the raising lever acts on the cover in a longitudinally central area of the cover.

8. Vehicle roof according to claim 1, wherein the first slider comprises an elongated carriage, a cover support pivotally connecting the cover to a front end of the elongated carriage and the raising lever being articulated to a rear end of said elongated carriage.

9. Vehicle roof according to claim 8, wherein the pivotal connection between the cover and the raising lever is provided at the cover support in a manner that allows a limited translational movement between the raising lever and the cover support.

10. Vehicle roof according to claim 9, wherein the connection of the raising lever to the cover support is provided by a link pin that is engaged in a longitudinal slot.

11. Vehicle roof according to claim 7, wherein the first slider comprises an elongated carriage, a cover support pivotally connecting the cover to a front end of the elongated carriage and the raising lever being articulated to a rear end of said elongated carriage.

12. Vehicle roof for a spoiler roof according to claim 1, wherein, in the closed position of the cover, the pivotal connection between the first slider and the cover support being located forward of a front edge of the roof opening and the articulation of the first slider to the raising lever is located rearwardly of the front edge of the roof opening.

13. Vehicle roof according to claim 8, wherein at least one of the first slider and the second slider are provided with at least a front slide shoe and a rear slide shoe, said slide shoes being slidably guided in a respective guide rail.

14. Vehicle roof according to claim 13, wherein the first and second sliders each carry slide shoes on each of opposite lateral sides thereof which respectively engage in inside and outside guide channels of the respective guide rails.

15. Vehicle roof according to claim 1, wherein the locking device comprises means for locking the first slider in relation to a respective guide rail.

16. Vehicle roof according to claim 15, wherein the means for locking comprises a locking element associated with the first slider in a manner causing it to participate in the sliding movement of first slider; wherein the guide rail has a stop recess into which the locking element is received when the cover system is located at a front end of the roof opening, said locking element remaining in said stop recess until said second slider is slid rearward from a position in which it is located in the raised position of the cover.

17. Vehicle roof according to claim 16, wherein the second slider serves as a means for locking the locking element in the stop recess whenever the cover is located at the front end of the roof opening, but releases the locking element as the cover is slid rearwardly from said raised position.

18. Vehicle roof according to claim 17, wherein the locking element comprises a locking lever articulated on the first slider.

19. Vehicle roof according to claim 17, wherein locking lever, when removed from the stop recess, rests against second slide during the rearward sliding.

20. Vehicle roof according to claim 16, wherein at least one stop element is provided as the locking element, said stop element being displaceably guided in an attachment of the first slider.

21. Vehicle roof according to claim 20, wherein the attachment of the first slider engages between a part of a respective guide rail having the stop recess and a part of the second slider which is provided with a second stop recess.

22. Vehicle roof according to claim 21, wherein at least one of the stop elements and the two stop recesses are provided on at least one side with inclined surfaces serving as means for producing displacement of the stop element relative to the two stop recesses.

23. Vehicle roof according to claim 21, wherein the stop element is spring-biased in the direction of a center position between the two stop recesses.

* * * * *